March 16, 1971     D. C. McNUTT     3,570,144
TEACHING PUZZLE
Filed June 11, 1969
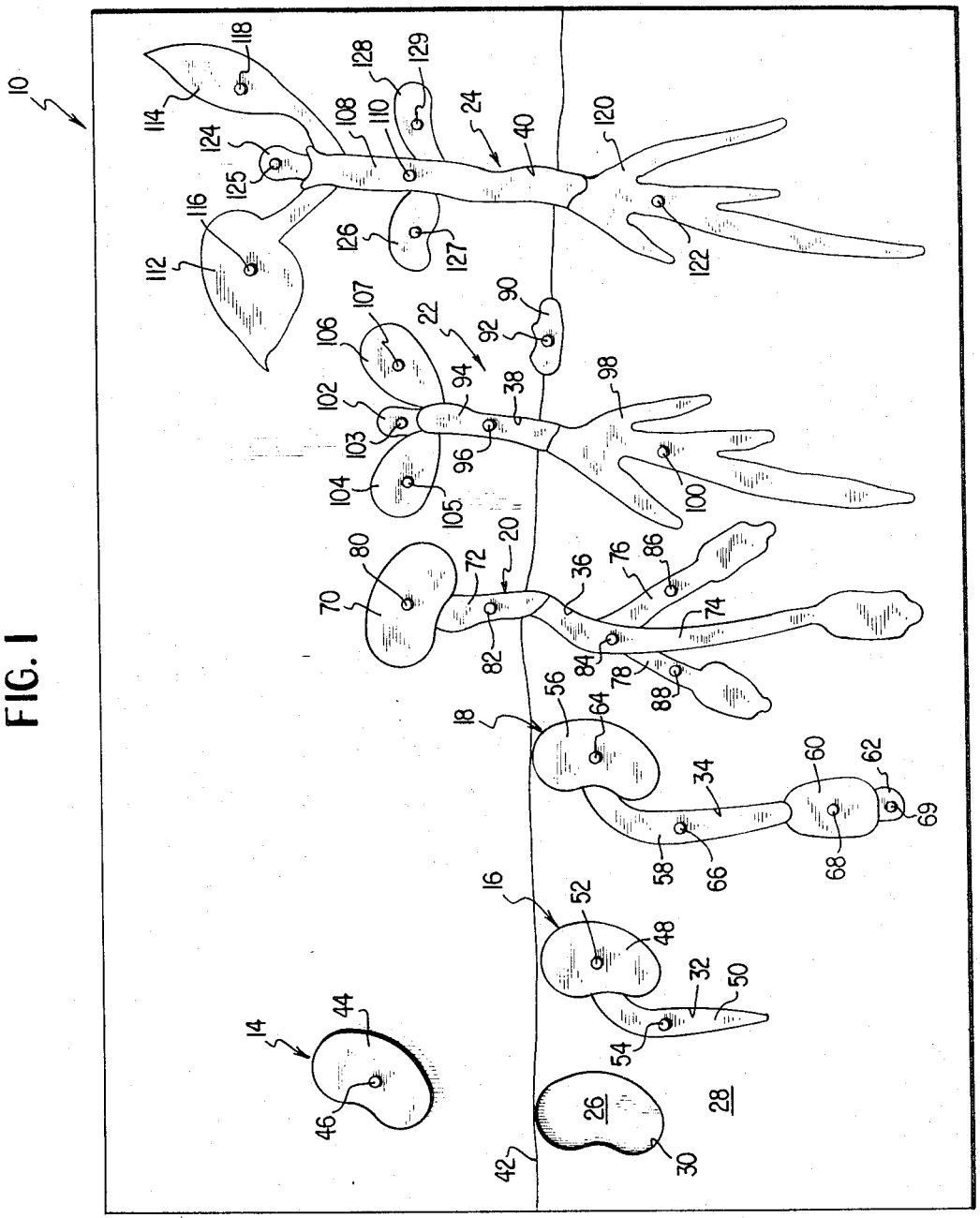
INVENTOR
DENYSE C. McNUTT

United States Patent Office 3,570,144
Patented Mar. 16, 1971

3,570,144
TEACHING PUZZLE
Denyse C. McNutt, 19 Alexandria Drive,
Oxon Hill, Md. 20021
Filed June 11, 1969, Ser. No. 832,134
Int. Cl. G09b 23/28; A63f 9/10
U.S. Cl. 35—20                                     6 Claims

ABSTRACT OF THE DISCLOSURE

A teaching puzzle and method are described to acquaint an individual with the life cycle of a living organism. A puzzle board is provided with spaced cut-outs which are shaped and sized to receive a different puzzle piece representative of a different stage of development in the life cycle of a living organism. A plurality of puzzle pieces are provided to fit within the spaced cut-outs and represent different stages of development in the life cycle of the organism.

---

Prior are jigsaw puzzles are quite common and, when assembled, depict a still life scene of any suitable description. Although there is inherently some learning involved in the assembling of a prior art jigsaw puzzle, the main purpose thereof is one of entertainment or pleasure.

Although puzzles are known which have teaching or learning as a primary purpose, it is believed that the prior art teaching puzzles depict only a single stage of development in the life cycle of a living organism.

A teaching puzzle is provided comprising a puzzle board having a plurality of spaced discrete cut-outs therein, each of the cut-outs being shaped and sized to receive a different puzzle piece means representative of a different stage of development in the life cycle of a living organism; and a plurality of puzzle piece means, each of the puzzle piece means being shaped and sized to fit one of the cut-outs and representing a different stage of development in the life cycle of the living organism. The teaching method comprises teaching the pupil the various parts of the living organism to be studied; providing the pupil with a puzzle of the type described; and instructing the pupil to position the various puzzle piece means in the respective cut-outs to visually display the development of the organism.

It is an object of the invention to provide a teaching puzzle representing different stages of development in the life cycle of a living organism.

Another object of the invention is to provide a method for teaching the life cycle of a living organism.

Another object of the invention is to provide a teaching puzzle comprised of a plurality of pieces each representing a different stage of development in the life cycle of a living organism.

FIG. 1 is a plan view of the teaching puzzle of the invention; and

FIG. 2 is a perspective view of one portion of the puzzle of FIG. 1 with one of the puzzle pieces illustrated as removed from the associated cut-out.

Attention is now directed to FIG. 1 wherein there is provided a puzzle 10 having as major components a puzzle board 12 and a plurality of puzzle piece means 14, 16, 18, 20, 22, 24.

The puzzle board 12 comprises a planar backing ply 26 and a front ply 28. The front ply 28 is severed to form spaced discrete cut-outs 30, 32, 34, 36, 38, 40. The material removed from the front ply 28 is conveniently used to form the puzzle piece means 14, 16, 18, 20, 22, 24. Consequently, each puzzle piece means readily fits in its associated cut-out. The cut-outs may be formed by running the front ply 28 through a conventional jigsaw (not shown) along a parting line 42. When the individual comes to the location where a cut-out is to be formed, the front ply 28 is turned to proceed from the parting line 42 to form the particular cut-out. In the alternative, the cut-outs may be stamped, molded or cast by suitable equipment.

In the illustrated embodiment of the invention, the germination phase of the life cycle of a dicotyledon is illustrated although it should be apparent that the life cycle or substantial part thereof of any living organism may be used. In order to depict the complete life cycle of the organism several puzzles may be used in series. The puzzle piece 14 preferably represents a stage of incipient growth and in the embodiment shown illustrates a seed 44. A handle 46 is attached to the seed 44.

The puzzle piece means 16 is divided into a seed 48 and a root 50, each of which is provided with a handle 52, 54. The puzzle piece means 18 illustrates a stage of further plant development and is comprised of a seed 56, a root 58 and a root hair 60 and a root tip 62 thereon. Each of the parts is provided with a handle 64, 66, 68, 69.

The puzzle piece means 20 comprises a seed 70, a stem 72, a primary root 74 and secondary roots 76, 78, each of which carries a handle 80, 82, 84, 86, 88.

The puzzle piece means 22 illustrates a still further stage of development of the dicotyledon wherein the seed coat, which had projected above the horizon, depicted by the parting line 42, in the previous stage of development, has separated from the remainder of the plant. The puzzle piece means 22 accordingly comprises a seed coat 90 having a handle 92, a stem 94 having a handle 96, and a root 98 having a handle 100. The stem 94 bears a shoot apex 102 and a pair of cotyledons 104, 106, each of which have handles 103, 105 and 107.

The puzzle piece means 24 illustrates a stage of maturity and comprises a stem 108 having a handle 110, a pair of leaves 112, 114 having handles 116, 118, and a root 120 having a handle 122. The stem 108 bears a shoot apex 124 and a pair of cotyledons 126, 128, all of which have handles 125, 127, 129. Although not shown, additional puzzles may be included in a set showing further stages of development of the organism. For example, the life cycle of a dicotyledon series includes puzzles showing the seed, the vegetative plant, the flower and the fruit.

It will be seen that the separate parts of the puzzle piece means represent identifiable parts of the living organism so that the pupil can more readily learn the different plant parts.

In using the puzzle 10 in the instruction of individuals, usually children, the pupil is first taught the names of the various parts of the organism. The pupil is provided with the puzzle 10, preferably with the pieces and piece parts in place. The pupil removes the pieces from the cut outs, naming each piece with help from a key sheet or an instructor. The pupil is then instructed to position the various puzzle pieces and parts thereof in the respective cut outs to visually display the development of the organism. Preferably the latter instructing step includes instructing the pupil to begin with the puzzle piece representing the stage of incipient growth or least development and proceeding to the stage of maturity or greater development.

I claim:
1. A teaching puzzle comprising
   a puzzle board having a plurality of spaced discrete cut-outs therein, each of the cut-outs being shaped and sized to receive a different puzzle piece means representative of a different stage of development in the life cycle of a living organism; and
   a plurality of puzzle piece means, each of the piece means being shaped and sized to fit in one of the cut-outs and representing a different stage of development in the life cycle of the living organism.
2. The teaching puzzle of claim 1 wherein the cut-outs are spaced in side by side fashion beginning with a stage of least development and proceeding to a stage of greater development.

3. The teaching puzzle of claim 2 wherein the cut-outs begin with a stage of incipiient growth and proceed to include a stage of maturity.

4. The teaching puzzle of claim 1 wherein at least some of the puzzle piece means comprise separate parts to fit in different segments of the same cut-out.

5. The teaching puzzle of claim 4 wherein the separate parts of the puzzle piece means include handle means extending therefrom.

6. The teaching puzzle of claim 4 wherein the separate parts of the puzzle piece means are representative of identifiable parts of the living organism.

References Cited

UNITED STATES PATENTS

| 1,173,298 | 2/1916 | Montessori | 35—72 |
| 2,316,786 | 4/1943 | Gottlieb | 35—40 |
| 3,381,394 | 5/1968 | Munro | 35—73X |

HARLAND S. SKOGQUIST, Primary Examiner

U.S. Cl. X.R.

35—8, 73; 273—157